ELECTRIC MOTOR BRUSH HOLDER ASSEMBLY
Filed May 26, 1967
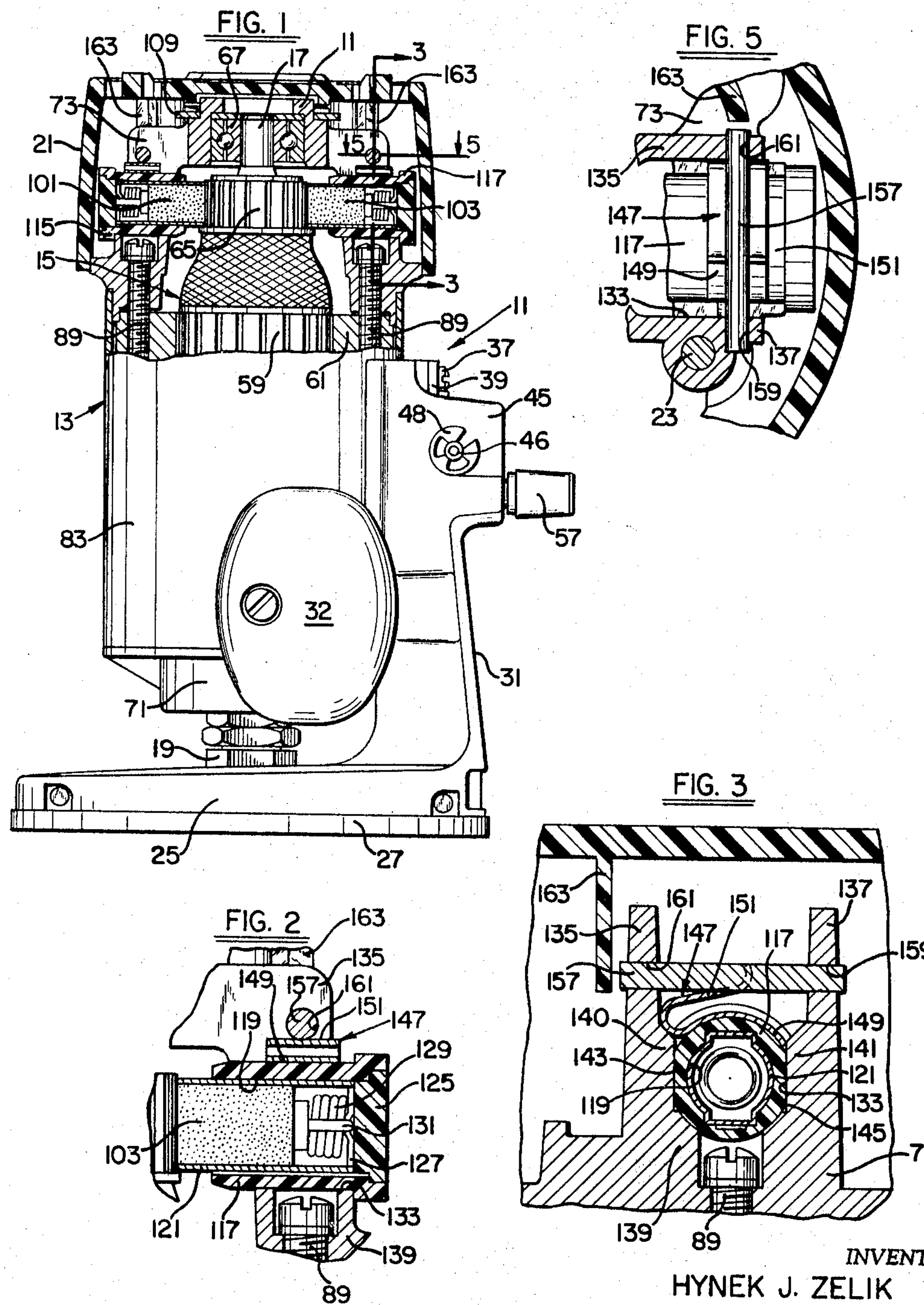
INVENTORS
HYNEK J. ZELIK
GEORGE W. COWMAN
BY Joseph R. Slatnik
ATTORNEY

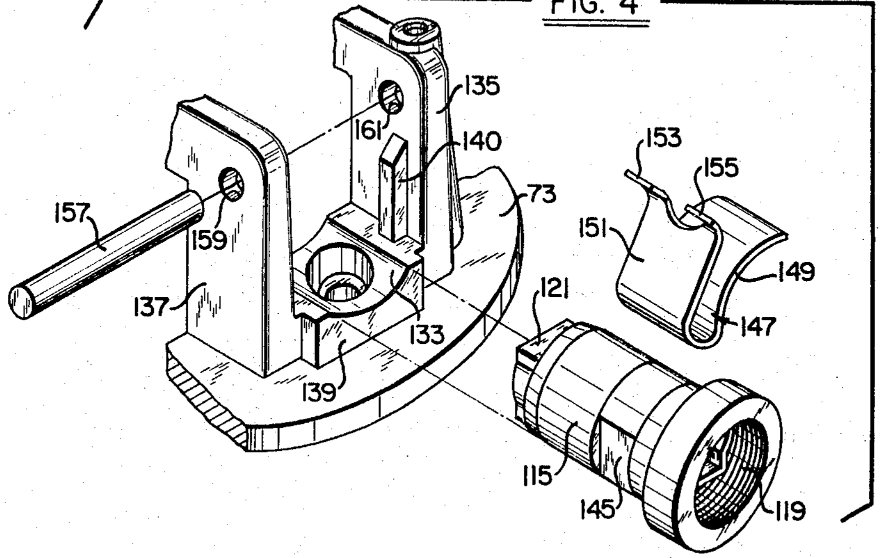
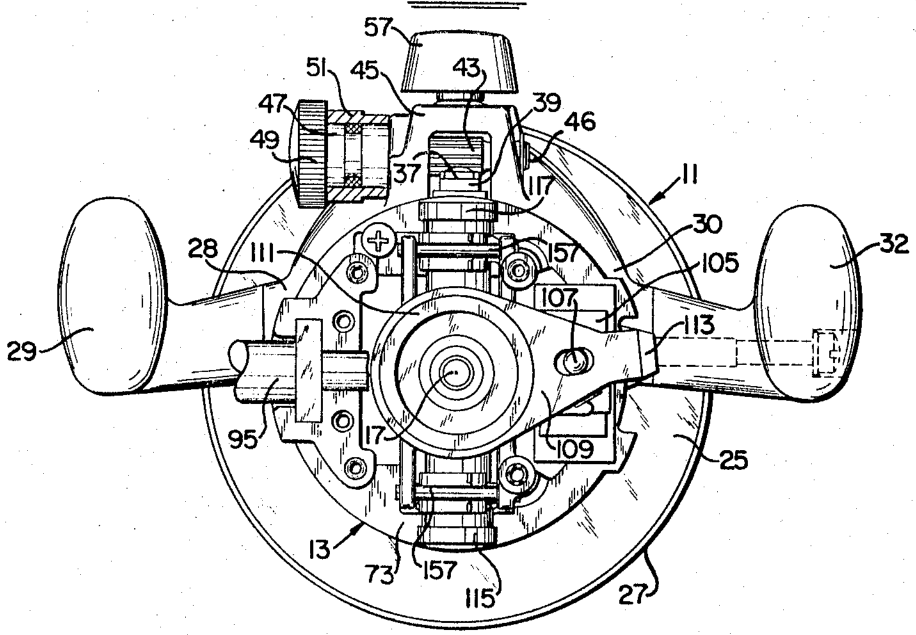
INVENTORS
HYNEK J. ZELIK
GEORGE W. COWMAN
BY Joseph R. Slatnik
ATTORNEY United States Patent Office 3,450,917

Patented June 17, 1969

3,450,917
ELECTRIC MOTOR BRUSH HOLDER ASSEMBLY

Hynek J. Zelik and George W. Cowman, Baltimore, Md., assignors to The Black and Decker Manufacturing Company, Towson, Md., a corporation of Maryland

Filed May 26, 1967, Ser. No. 641,692
Int. Cl. H02k *13/10*
U.S. Cl. 310—247 5 Claims

ABSTRACT OF THE DISCLOSURE

The device disclosed herein is a hand-held or portable router which includes a router bit driven directly by an electric motor. A composite housing encases and supports the motor and is adjustably secured to a base which supports the motor upon the work and selects the depth of cut of the tool bit. The motor includes a suction cooling fan which draws cooling air therethrough and discharges it around the tool bit to blow away chips, dust, etc. Brush holders carrying the electric brushes are supported and securely retained upon the motor housing and are covered and protected by a housing cap.

SUMMARY OF THE INVENTION

The present invention relates to a brush holder support and retainer construction for electric motors. More particularly, the invention includes a construction in which an electric motor brush holder is seated in a pocket in a rigid motor frame or housing and is securely retained therein by a spring clip. The spring clip is held in biasing relation with its holder by a pin bridging the pocket. A detachable protective cap covers the housing and the brush holder and, when in position, prevents the spring holding pin from pulling out of its mounting. However, by removing the cap and the pin, the brush holder may be inserted or removed from its mounting pocket with the brush and leads intact.

Main objects, therefore, of the present invention are to provide an improved electric motor brush holder support and retainer construction adapted to securely hold the brush holder in position and prevent it from rattling or coming loose, and one which permits rapid and easy brush holder removal and replacement with the brush and electrical leads secured in place.

Further important objects of the present invention are to provide an improved support and retainer construction of the above nature characterized in that is reduces the possibility of damage to the brush holder and compensates for small manufacturing tolerances between the brush holder and associated motor components.

Additional objects include the provision of an improved support and retainer construction of the above character which is relatively inexpensive to manufacture, rugged in construction and reliable in use.

Other objects and advantages of the present invention will become more apparent from a consideration of the detailed description to follow taken in conjunction with the appended drawings.

BRIEF DESCRIPTION OF THE DRAWINGS

FIG. 1 is an elevational view, partly in section, illustrating a router embodying the present invention:

FIG. 2 is an enlarged view of a portion of FIG. 1 illustrating the brush holder retainer construction of the present invention;

FIG. 3 is an enlarged sectional view of FIG. 2 taken along the line 3—3 thereof;

FIG. 4 is an exploded perspective view illustrating the brush holder retainer construction of the present invention;

FIG. 5 is an enlarged sectional view of the structure of FIG. 1 taken along the line 5—5 thereof; and FIG. 6 is a top plan view of FIG. 1 shown with the cap removed for clarity.

BROAD STATEMENT OF THE INVENTION

Broadly described, the present invention relates to an electric motor construction of the type including a housing, a rotatable armature supported by said housing and having a commutator, that improvement which comprises a brush holder supported upon said housing and adapted to carry an electric brush engageable with said commutator, means defining a pocket in said housing receiving said brush holder, spring means engaging said brush holder, pin means removably mounted on said housing bridging said pocket and engaging said spring means, whereby said spring means is retained against said brush holder to bias said brush holder snugly into said pocket, and a removable cap on said housing covering said brush holder, said cap having means formed thereon cooperable with said pin means, whereby to prevent removal of said pin means when said cap is in place on said housing.

In another aspect, the present invention relates to an electric motor construction of the type including a housing, a rotatable armature supported by said housing and having a commutator, that improvement which comprises a brush holder supported upon said housing and adapted to carry an electric brush engageable with said commutator, said housing having a pocket receiving said brush holder, removable pin means bridging said pocket, a clip spring having spaced legs, one of said spring legs fitting against said brush holder, the other spring leg engaging and biased toward said one leg by said pin means whereby to load said spring and tightly hold said brush holder in said pocket.

DETAILED DESCRIPTION

Referring now more specifically to the drawings, the present invention shown embodied in a router illustrated generally at 11 in FIGS. 1 and 6. However, it is to be understood that this invention finds more general use in the broad class of universal electric motors. With this in mind, the router 11 is seen to include a generally cylindrical, composite housing 13 having an electric motor 15 disposed therein. The motor 15 drives a motor shaft 17 adapted to have a tool bit (not shown) secured thereto for rotation therewith through a collet 19. The end of the housing 13 remote from the collet 19 has a cover cap 21 secured thereto by screws 23.

The housing 13 is supported relative to a work surface by a base 25 having a sub base 27 secured thereto by screws (not shown) and an upstanding integral arm 31. A pair of legs 28, 30 extend laterally from the arm 31 to either side thereof and each has a knob 29, 32, respectively, received thereto for manual manipulation of the router 11. The motor housing 13 has an elongated rack 39 secured thereto by screws 37 and which is slidably received in the base arm 31. The teeth on the rack 39 are engaged by a pinion 43 rotatably supported upon a generally U-shaped bracket portion 45 integral with the base arm 31. The pinion 43 is carried by a shaft 46 which bridges the bracket portion 45 being held in place by a retainer 48, and which has an enlarged, outer end 47 provided with a knurled knob 49 and with a sleeve 51 fitted thereover. Thus, by turning the knob 49, the pinion 43 also turns and vertically shifts the rack 39 together with the housing 13 relative to the base 25 to thereby adjust the depth of cut of the tool bit (not shown). The sleeve 51 may have spaced graduations (not shown) which align with a reference point (not shown) on the bracket 45 to accurately determine the extent of vertical adjustment of the housing 13 attained through turning the knob 49. A clamp (not shown) is carried within the bracket 45 and is cooperable with the rack 39 to hold the housing 13 in selected, vertically adjusted positions. A threaded knob 57 is connected to the clamp (not shown) for selectively tightening or loosening the latter to lock the housing 13 in place or release it for adjustment relative to the base 25.

The motor 15, supported within the housing 13, is seen to be of the universal type having a rotatable armature 59 disposed within a stationary field 61. The armature 59 includes armature windings 63 and a commutator 65 fixed to the motor shaft 17, the latter being rotatably supported, fore and aft, by bearings 67 (only one of which is shown) carried by front and rear housing members 71, 73, respectively. The field 61 is encased by a tubular housing sleeve 83 sandwiched axially between the front and rear housing members 71, 73 which together with the sleeve 83 define the housing 13. The field 61 is seated against the rear housing member 73 and an annular baffle (not shown) within the tubular housing sleeve 83 and secured behind the front housing member 71. The front and rear housings 71, 73 are drawn up in tight compressing relation on the housing sleeve 83 by axial bolts 89 which extend through the rear housing 73 and the field 61 and are threaded into the baffle (not shown). A motor cooling fan (not shown) is secured for rotation with the shaft 17 and is disposed within the front housing 71 to draw cooling air through the motor and discharge it through apertures in the front housing 71. For a more detailed explanation of the particular housing and fan construction illustrated in the drawings and the several advantages thereof, reference may be made to the copending application of Hynek J. Zelik, Ser. No. 640, 029, filed May 22, 1967 and owned by the assignee of the present application; however, since this construction forms no part of the present invention, it is not illustrated nor described further here.

Electric current is supplied to the motor 15 through a line cord 95 trapped between the housing member 73 and the cap 21 and adapted to be connected to a suitable electrical source. The line cord 95 is connected through an on-off switch 105 to a pair of electric brushes 101, 103 adapted to engage the commutator 65. The switch 105 has a toggle lever 107 which is received in an apertured switch lever 109 (FIG. 6). One end of the switch lever 109, which is generally L-shaped in configuration, is pivotally received on a boss 111 formed on the outer end of the rear housing member 73 while the other end thereof extends out between the rear housing member 73 and the cover cap 21 and has a finger knob 113 fixed thereto. Thus, when the switch lever 109 is turned to close the switch 105, the motor 15 is energized and the tool is ready for use.

According to the present invention, the brushes 101, 103 are carried by brush holders 115, 117, respectively, which are removably supported in the rear housing member 73 in a novel manner. Each of the illustrated brush holders 115, 117, together with the support arrangement therefor is substantially identical and it is to be understood that like numerals refer to like parts for both.

Referring now to FIGS. 2–5, the brush holders 115, 117 are shown as being generally cylindrical in shape and each has a central opening 119 extending longitudinally therethrough. A metallic, preferably brass, insert 121 to which, in use, electrical power leads are directly connected to for energizing the brushes, is pressed into each brush holder opening 119 and is adapted to slidably receive the electrical brush 101, 103, respectively. A plug 125 is threaded into the outer end of each holder 115, 117 and traps a shunt cap 127 between itself and the inner end of the insert 121. A compression spring 129 is trapped between each plate 127 and the brushes 101, 103 and biases the latter outwardly of the inserts 121 and into engagement with the commutator 65. Shunts 131 extend through the springs 129 and interconnect the shunt caps 127 and the brushes 101, 103, respectively, in the usual manner.

The brush holders 115, 117 are seated in diametrically opposed, channel shaped pockets 133 in the rear housing member 73, which pockets 133 are defined by opposed sets of spaced, parallel posts 135, 137 joined by a base 139. The posts 135, 137 of each set are provided with opposed ears 140, 141 adapted to fit into opposed, flat recesses 143, 145, respectively, in the brush holders 115, 117 and each base 139 is curved generally complementary to the outer surface of the brush holders so that the holders fit neatly into the pockets 133 and are prevented from turning therein or from pulling axially out of the pockets 133.

The brush holders 115, 117 are securely retained in the pockets 133 by shaped clip springs 147 each of which has a curved first leg 149 adapted to fit neatly over the top of its respective brush holder 115, 117, and a second leg 151 bent back on the leg 149 but spaced therefrom and provided with spaced, upstanding tabs 153, 155 at the terminal end thereof. A removable retainer pin 157 extends through an opening 159 in each of the posts 135 and into a partially obstructed opening 162 in each post 135 thereby bridging each pocket 133. When the parts are assembled, the pins 157 are positioned between the tabs 153, 155 on each clip spring 147 and depress the spring legs 151 thereby maintaining the spring legs 149 tightly against the brush holder 115, 117, respectively. This arrangement maintains the brush holder 115, 117 securely seated in the pockets 133 and prevents them from becoming loose or rattling during use of the device regardless of small manufacturing tolerances. In addition, the brush holders 115, 117 are easily and quickly removable from the pockets 133 simply by sliding the pins 157 out through the opening 159 and lifting the springs 147 out of the pockets 133.

Since the brushes 101, 103 are energized through the metal inserts 121 which have electrical leads (not shown) directly connected thereto at their exposed portions, the entire brush and brush holder parts may conveniently be assembled and then positioned in the pockets 133 after which the spring 147 and pins 157 are mounted in place. To insure that the pins 157 do not pull out of their openings 159 during use, the cover cap 21 is provided with dependent lugs 163 which overlay the openings 159 when the cover cap 21 is in place. Alternately, the pins 157 could have enlarged heads (not shown) to prevent them from passing fully through the opening 161 in the posts 135, in which case the openings 159 could be unobstructed. Furthermore, the pins 157 could be threaded into one of the openings 159, 161 in which case the lugs 163 could be omitted.

By foregoing, there has been disclosed an electric motor brush holder retaining construction calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

We claim:

1. In an electric motor construction of the type including a housing, a rotatable armature supported by said housing and having a commutator, that improvement which comprises a brush holder supported upon said housing and adapted to carry an electric brush engageable with said commutator, means defining a pocket in said housing receiving said brush holder, spring means engaging said brush holder, pin means removably mounted on said housing bridging said pocket and engaging said spring means, whereby said spring means is retained against said brush holder to bias said brush holder snugly into said pocket, and a removable cap on said housing covering said brush holder, said cap having means formed thereon cooperable with said pin means, whereby to prevent removal of said pin means when said cap is in place on said housing.

2. In an electric motor construction of the type including a housing, a rotatable armature supported by said housing and having a commutator, that improvement which comprises a brush holder supported upon said housing and adapted to carry an electric brush engageable with said commutator, said housing having a pocket receiving said brush holder, removable pin means bridging said pocket, a clip spring having spaced legs, one of said spring legs fitting against said brush holder, the other spring leg engaging and biased toward one leg by said pin means whereby to load said spring and tightly hold said brush holder in said pocket.

3. A construction as defined in claim 1 wherein said brush holder and said housing are provided with cooperable projection and recess means serving to prevent turning movement of said holder relative to said housing.

4. A construction as defined in claim 2 wherein said spring other leg is provided with spaced tabs between which said pin means fits.

5. A construction as defined in claim 1 wherein said pin means includes a pin extending through aligned openings in said housing, one of said openings being at least partially obstructed, said cover cap having a dependent projection aligned with the other of said openings when said cover cap is in position.

References Cited

UNITED STATES PATENTS

| | | | |
|---|---|---|---|
| 3,032,672 | 5/1962 | Blachly | 310—247 X |
| 3,177,388 | 4/1965 | Cook | 310—247 |
| 3,187,214 | 6/1965 | Brezosky | 310—239 |
| 3,329,844 | 7/1967 | Happe | 310—247 X |

FOREIGN PATENTS

| | | |
|---|---|---|
| 1,486,923 | 6/1967 | France. |

MILTON O. HIRSHFIELD, *Primary Examiner.*

E. SUTTON, *Assistant Examiner.*